United States Patent [19]
Scott et al.

[11] Patent Number: 5,220,863
[45] Date of Patent: Jun. 22, 1993

[54] CONICAL DIAPHRAGM AND METHOD OF MAKING

[75] Inventors: Daniel G. Scott, Pittsburgh; William K. Mong, N. Huntingdon; Willard P. Spalding, Pittsburgh, all of Pa.

[73] Assignee: Westinghouse Air Brake Company, Wilmerding, Pa.

[21] Appl. No.: 884,359

[22] Filed: May 18, 1992

[51] Int. Cl.⁵ .............................................. F01B 19/00
[52] U.S. Cl. .............................. 92/103 F; 92/98 R; 92/103 SD; 156/245; 264/262; 264/268
[58] Field of Search .......... 92/96, 98 R, 98 D, 103 R, 92/103 F, 103 SD; 156/245; 26.4/262, 263, 268, 138

[56] References Cited
U.S. PATENT DOCUMENTS

| 2,460,168 | 1/1949 | Caserta | 92/103 F |
| 4,989,497 | 2/1991 | Lerma | 92/103 F |

FOREIGN PATENT DOCUMENTS

| 0237410 | 11/1959 | Australia | 92/96 |
| 0551265 | 11/1956 | Italy | 92/103 F |
| 0022460 | 2/1982 | Japan | 92/96 |

*Primary Examiner*—Thomas E. Denion
*Attorney, Agent, or Firm*—G. J. Falce

[57] ABSTRACT

A fabric reinforced molded conical diaphragm and method of making in which the parting line of the diaphragm mold is arranged such that the flashing and reinforcing fabric of the molded diaphragm are on the sidewall of the outer clamping bead at a location displaced from the juncture of the sidewall and the bottom surface thereof, so that upon inverting the diaphragm member, the fabric free bottom surface of the clamping bead is transposed to the sidewall of the diaphragm clamping bead, thereby providing a smooth, accurately sized outer periphery of the diaphragm to facilitate its assembly.

5 Claims, 4 Drawing Sheets

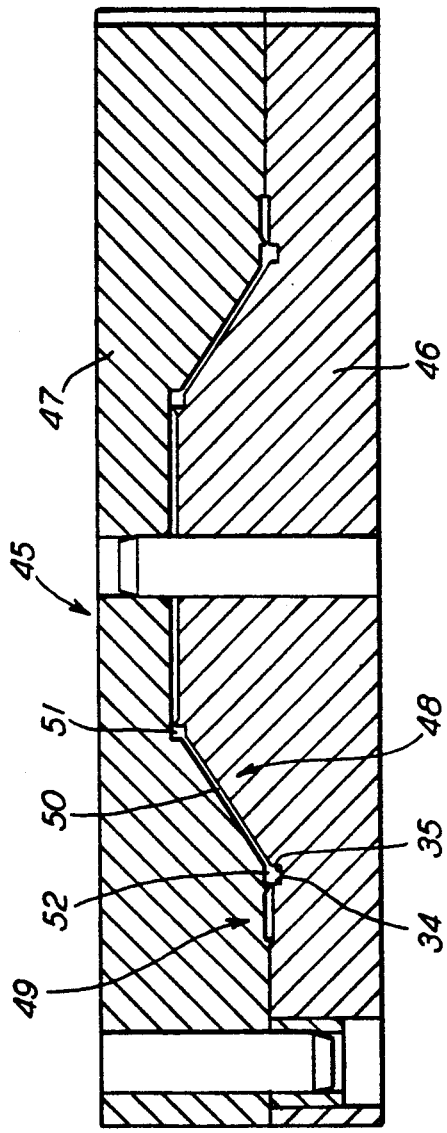
FIG. 5
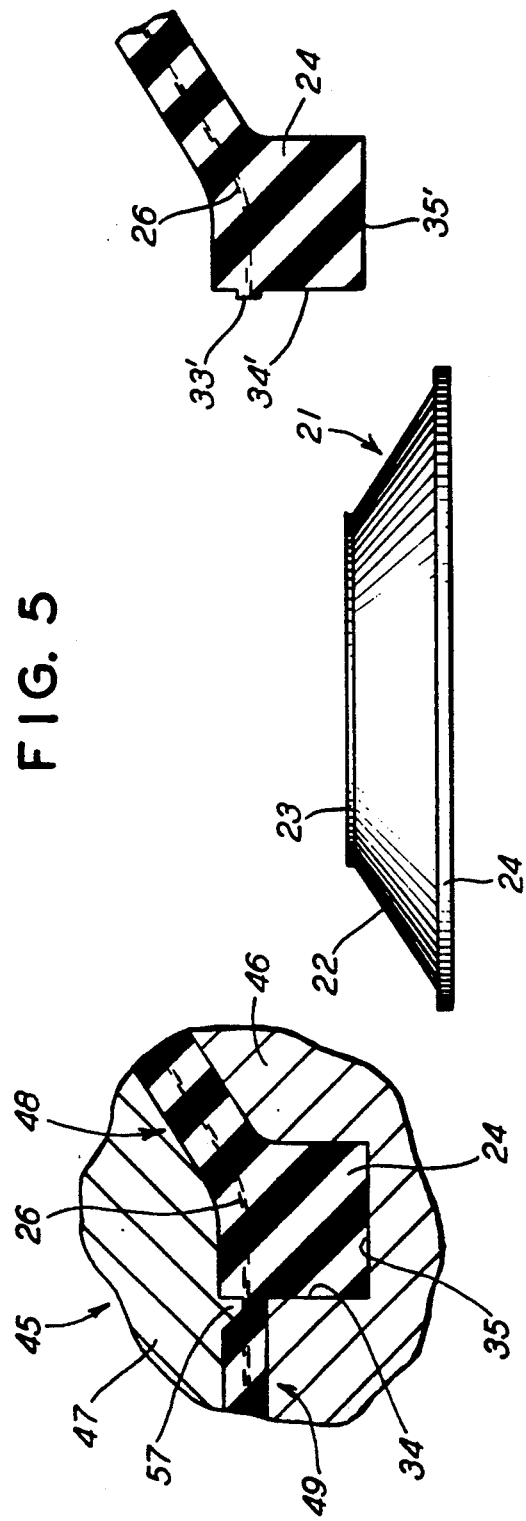
FIG. 6B
FIG. 6
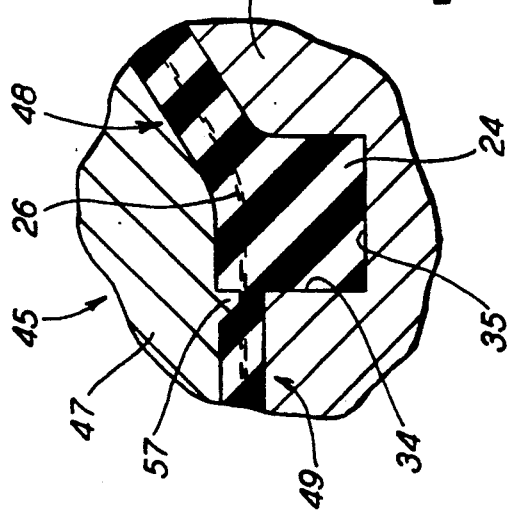
FIG. 6A

CONICAL DIAPHRAGM AND METHOD OF MAKING

BACKGROUND OF THE INVENTION

The present invention is related to conical-type diaphragms and particularly to diaphragm piston assemblies in which conical-type diaphragms are employed with a reinforcing fabric, as typically required for high pressure applications.

Generally, diaphragm piston operation requires a convolution in the skirt area of the diaphragm to accommodate axial movement of the piston member, to which the inner periphery of the diaphragm is clamped, relative to a body, in which the outer periphery of the diaphragm is clamped. Diaphragms having a molded-in convolution have given way to conical-type diaphragms, such as shown in FIG. 1 of the drawings. In that the fabric in these conical diaphragms tends to remain centered within the rubber during the molding process, conical diaphragms are better adapted to the application of reinforcing fabric than are diaphragms having a molded-in convolution. Accordingly, the conical diaphragm, as shown in U.S. Pat. No. 3,173,342 provides a more reliable diaphragm over a longer service life.

In that the conical-shaped diaphragm is molded from a flat, annular, preformed blank having a layer of fabric pressed between opposing outer layers of rubber, it will be appreciated that the fabric becomes somewhat distorted when forced to assume a conical shape during molding. This is due to the fact that the warp and woof threads of the fabric material located near the inner diaphragm periphery are compressed more closely together, while the warp and woof threads near the outer diaphragm periphery are spread further apart. While this fabric distortion is insufficient to wrinkle the diaphragm, there is a definite proclivity of the diaphragm to assume a somewhat oval shape, due at least in part to this fabric distortion.

This oval shape of the cone diaphragm is more pronounced at its outer periphery, which is clamped in the valve body during assembly following clamping of the inner diaphragm periphery between a piston and follower. Since a convolution naturally forms in the annular space between the piston and body during assembly, there is a tendency for the outer diaphragm periphery to be flipped out of its clamping groove by the tension in the convolution. This assembly difficulty is exacerbated by the fact that the outer diaphragm periphery, being oval-shaped, does not fit perfectly in the annular clamping groove. In order to overcome this problem, the diameter of the clamping bead at the diaphragm outer periphery is made oversize, so that its interference with the clamping groove O.D. provides an added measure of retention to facilitate assembly. This proved to not be a full-proof solution to the problem, however, due to the fact that the fabric at the diaphragm outer periphery, which is trimmed after completion of the diaphragm molding process, can not be trimmed perfectly flush with the diaphragm bead and may also be trimmed irregularly. Consequently, the desired interference fit between the diaphragm outer periphery and the clamping groove O.D. necessary to assure proper diaphragm retention is not consistently obtained.

In addition, further variations in the O.D. of the conical diaphragm of FIG. 1 occur due to manufacturing tolerances in the mold portions between which the diaphragm cavity is formed. This is due to the fact that the outer clamping bead of the diaphragm is formed across the aforementioned mold portions, as can be seen in FIG. 2 of the drawings.

SUMMARY OF THE INVENTION

It is therefore the main object of this invention to provide a fabric reinforced, conical-type diaphragm and a method of making such diaphragm wherein the outer periphery of the diaphragm, as assembled, is absent of exposed fabric.

It is a further object of this invention to provide a cone-shaped diaphragm and method of making such diaphragm in accordance with the foregoing objective, wherein unidirectional assembly of the diaphragm is assured.

Briefly, in fulfilling these objectives, there is provided a molded, conical-type diaphragm in which the diaphragm flashing including the reinforcing fabric protrudes from the sidewall of the outer diaphragm clamping bead in the "as molded" condition of the diaphragm, so that the bottom surface of the clamping bead is free of any flashing. Subsequently inverting the diaphragm by turning it inside-out transposes the smooth bottom surface of the clamping bead to the sidewall thereof, whereby the diaphragm outer periphery is free of protrusions that typically exist following trimming of the flashing.

These and other objects and advantages of the invention will become more apparent from the following more detailed explanation when taken in conjunction with the accompanying drawings in which:

FIG. 5 is a sectional elevation view of a curing mold developed in accordance with the present invention;

FIG. 6 is an elevation view of a diaphragm member formed in the curing mold of FIG. 5;

FIG. 6A is a partial enlarged sectional view of the outer clamping bead of the diaphragm of FIG. 6 illustrating the location of mold flashing and reinforcing fabric after removal of the diaphragm from its curing mold;

FIG. 6B is a partial enlarged view of the clamping bead of FIG. 6 following trimming of the flashing and reinforcing fabric in the view of FIG. 6B;

DESCRIPTION AND OPERATION

Figure 2:
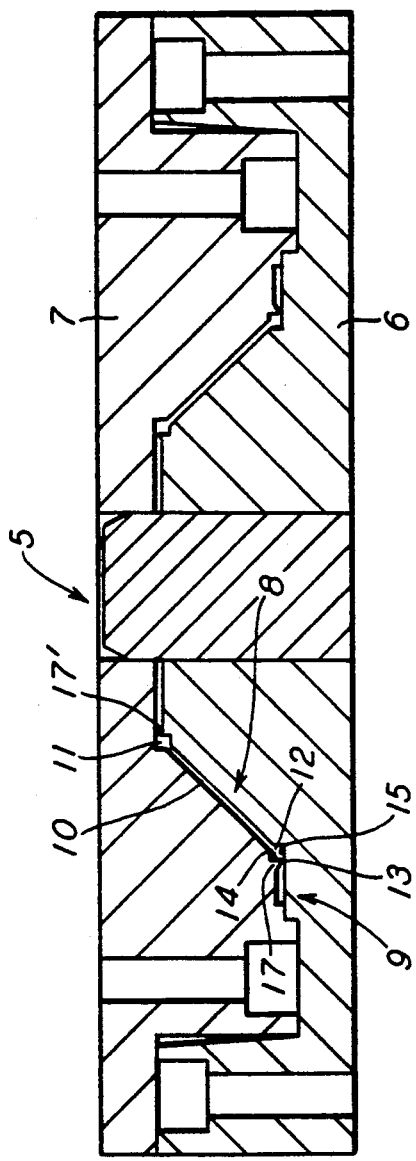
FIG. 2 is a sectional elevation view of a curing mold employed in the process of molding the conical diaphragm of FIG. 1.
Figure 1:
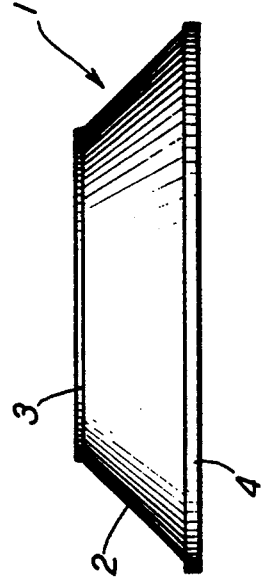
FIG. 1 is a sectional elevation view of a conical type diaphragm known in the prior art.

Referring now to FIG. 1, there is shown a conical-type diaphragm 1, as known in the prior art, this diaphragm having a truncated skirt portion 2 terminating in an inner clamping bead 3 that provides the inside diameter of the diaphragm and an outer clamping bead 4 that provides the outside diameter of the diaphragm. This diaphragm 1 is typically formed in a curing mold 5 having a male portion 6 and a female portion 7, as shown in FIG. 2. Formed between the male and female portions of curing mold 5 is a diaphragm cavity 8 and an overflow cavity 9, diaphragm cavity 8 consisting of a relatively narrow, straight sided, tapered section 10 corresponding t the diaphragm skirt portion 2 terminating in enlarged end cavities 12 corresponding to the inner and outer diaphragm clamping beads 3 and 4. Overflow cavity 9 extends laterally from enlarged end cavity 12 at the juncture 13 of sidewall 14 formed in female portion 7 and the base 15 formed in male portion 6. Sidewall 14 terminates in a pinch bead 17 at juncture 13, which cooperates with a pinch bead 17' associated with end cavity 11 to maintain the reinforcing fabric 16 centered within cavity 10 during the molding of diaphragm 1, as can be clearly seen in the enlarged view of FIG. 2A. This reinforcing fabric 16 is directed by pinch bead 17 so as to enter overflow cavity 9 at juncture 13.

Figure 2B:
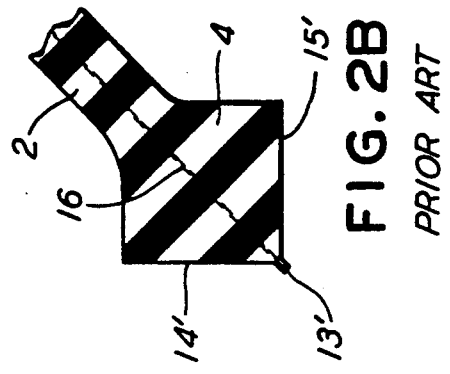
FIG. 2B is a partial enlarged view of the clamping bead of FIG. 1 following trimming of the flashing and reinforcing fabric in the view of FIG. 2A.
Figure 2A:
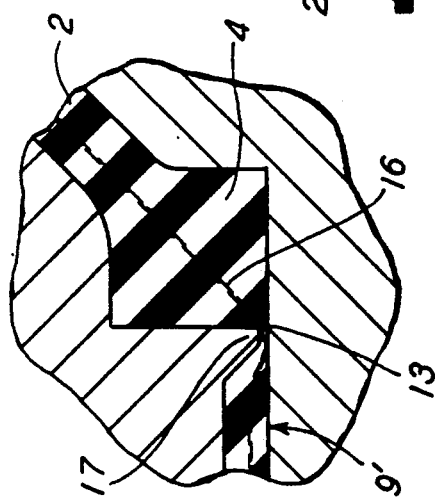
FIG. 2A is a partial enlarged sectional view of the outer clamping bead of the diaphragm of FIG. 1 illustrating the location of the mold flashing and reinforcing fabric after removal of the diaphragm from its curing mold.

It will be appreciated, therefore, that in trimming from diaphragm 1 flashing 9' in the form of excess rubber and fabric found in overflow cavity 9, after the diaphragm is cured and removed from curing mold 5, diaphragm clamping bead 4 exhibits a ragged edge 13', as shown in FIG. 2B, due to the exposed fabric being at a location corresponding to juncture 13. In that this ragged edge 13' is between the diaphragm outside diameter and bottom surfaces 14' and 15', the exposed fabric interferes with the fit between the outside diameter of clamping bead 4 and the diaphragm clamping groove during assembly, regardless of whether the diaphragm is assembled in its "as molded" condition or in an inverted condition, thereby adversely affecting such assembly, as heretofore discussed.

In accordance with the present invention, there is shown in FIG. 6 a conical diaphragm 21 having a truncated skirt portion 22 terminating in an inner clamping bead 23 that provides the inside diameter of the diaphragm and an outer clamping bead 24 that provides the outside diameter of the diaphragm. Centered within skirt portion 22 and clamping beads 23 and 24 is a section or layer of reinforcing fabric 26, as shown in FIG. 6B, it being noted that this fabric is exposed at a location 33' on surface 34' of clamping bead 24 corresponding to the outside diameter of diaphragm 21 in its "as molded" condition. This location 33' at which fabric 26 surfaces differs from the location 13' of diaphragm 1 for a reason, as hereinafter discussed.

Figure 3:
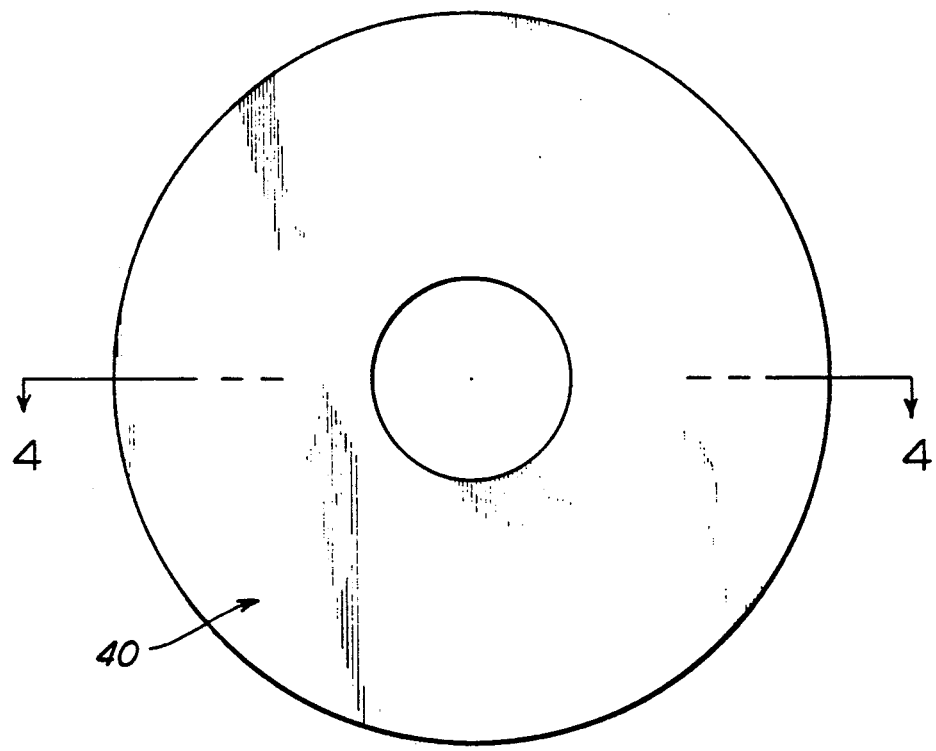
FIG. 3 is a plan view of a preformed blank, from which a diaphragm is typically molded, prior to being placed in the curing mold.
Figure 4:
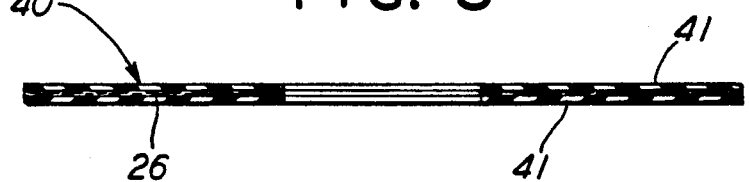
FIG. 4 is a section view taken along the line 4—4 of FIG. 3.

In molding diaphragm 1, an annular, preformed blank 40 is formed by cold pressing a layer of fabric material 26 between opposing layers of rubber 41, as shown in FIGS. 3 and 4. This preformed blank 40 is placed in a curing mold 45 comprising a male portion 46 and a female portion 47, as shown in FIG. 5. Formed between the male and female portions is a diaphragm cavity 48 and an overflow cavity 49. Diaphragm cavity 48 consists of a relatively narrow, straight-sided, tapered section 50 corresponding to skirt portion 22 terminating in enlarged end cavities 51, 52 corresponding to the inner and outer diaphragm clamping beads 23 and 24. Overflow cavity 49 extends laterally from sidewall 34 formed along the parting line between male portion 46 and female portion 47 of curing mold 45. This parting line may intersect sidewall 34 anywhere along its length except at the juncture of sidewall 34 with base 35. Preferably, the parting line intersects sidewall 34 near its upper end, as shown in FIG. 6A, so that the major portion of outer clamping bead 24 is formed in male portion 46 of curing mold 45.

With female portion 47 disassembled from its clamping position on male member 46, preformed blank 40 is aligned on male portion 46, so as to overlay diaphragm cavity 48 and at least a part of overflow cavity 49. A pinch bead 57 formed on female portion 47 and pinch bead 57, formed on male portion 46 of the curing mold at the extreme outside diameter of end cavities 51 and 52 firmly secures blank 40 in position when female portion 47 is clamped in place on male portion 46.

Of particular significance is the fact that fabric 26 is directed by pinch bead 57 and overflow cavity 49, so as to pass into overflow cavity 49 via sidewall 34 of end cavity 52, as shown in FIG. 6A. Following curing of the preform blank to form diaphragm 21, the diaphragm is removed from curing mold 45 and the flashing formed in overflow cavity 49 is removed, as by a trim die (not shown). In that the trimmed fabric 26 emerges from clamping bead 24 at location 33' on sidewall surface 34', as opposed to surfacing at the juncture of sidewall 34' and bottom surface 35', as in the prior art diaphragm 1, bottom surface 35' of outer clamping bead 24 is free of fabric along its entire length. It will be appreciated, therefore, that this fabric free bottom surface 35' of clamping bead 24 in the "as molded" condition of diaphragm 21 is transposed when diaphragm 21 is inverted by turning it inside-out. In this manner, the position of fabric-free surface 35' changes from the bottom of clamping bead 24 to the outer sidewall of bead 24 corresponding to the diaphragm outside diameter. Consequently, the critical outside diameter of diaphragm 21 becomes free of any ragged and/or irregular surface, thereby facilitating the diaphragm assembly, as illustrated in FIGS. 8-10.

Figure 7:
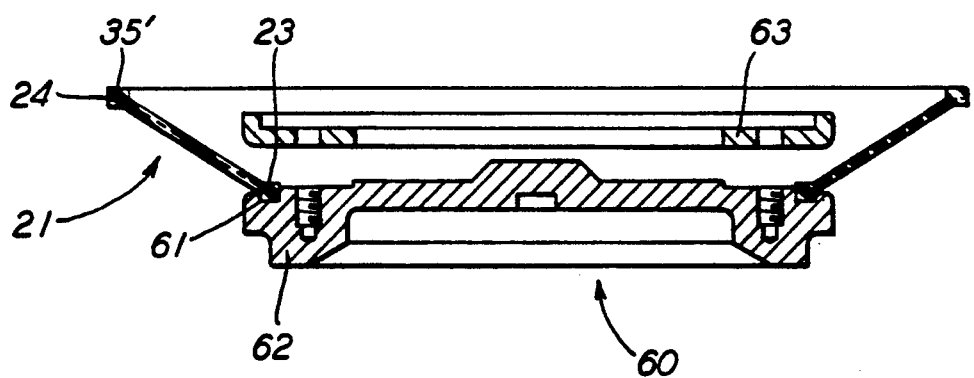
FIGS. 7–10 are sectional assembly views showing the various stages in the assembly of the diaphragm of FIG. 6 in the annular space between a piston follower and the body of a device with which a diaphragm type piston is operatively employed.

In FIG. 7, diaphragm 21 is shown turned upside-down in its "as molded" condition and connected at its inner periphery to a piston member 60 of a fluid pressure device, by inserting inner clamping bead 23 in an annular groove 61 formed adjacent the outer periphery of a piston follower 62. The inner clamping bead tends to remain fixed in clamping groove 61, since diaphragm 21 is unstressed at this time, due to outer clamping bead 24 being free to assume its "as molded" disposition relative to inner clamping bead 23. A clamping plate 63 is fastened to piston follower 62 by screws 64, as shown in FIGS. 8, 9 and 10. In this manner, bead 23 is confined under pressure in groove 61 to fasten diaphragm 21 to piston member 60. It will be understood that this initial assembly is accomplished with cover 66, shown in FIGS. 9 and 10 removed. Also, since diaphragm 21 has been turned upside-down, the "as molded" bottom surface 35', of outer clamping bead 24 forming the base of the conical shaped diaphragm 21 is facing upwardly in FIG. 7.

Figure 8:
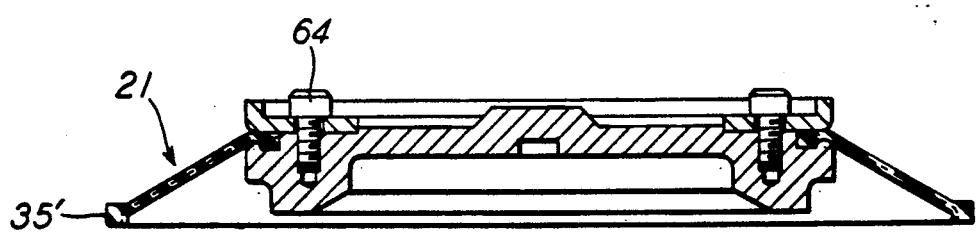
Figure 11:
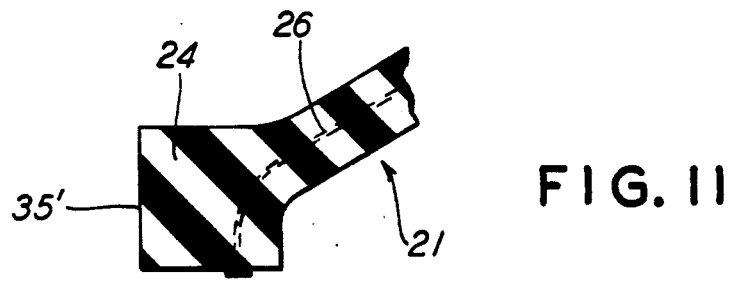
FIG. 11 is a partial enlarged sectional view of the inverted diaphragm in FIG. 8 showing the clamping bead with its bottom and sidewall transposed.

In FIG. 8, diaphragm 21 is shown inverted by peeling the outer diaphragm periphery down over the inner diaphragm periphery, which is fastened at inner clamping bead 23 to piston member 60, as explained. It will now be appreciated that by so inverting diaphragm 21 to an "inside-out" configuration, the "as molded" bottom surface 35' has been transposed to the outer periphery of diaphragm 21. Likewise, sidewall 34' has been transposed to the bottom side of diaphragm 21. In that bottom surface 35' of clamping bead 24, in the "as molded" condition of diaphragm 21, is absent of any exposed fabric along its entire surface, as previously explained and clearly shown in FIG. 11, this transposed surface 35' of outer clamping bead 24, now provides a smooth, accurately sized outer periphery of diaphragm 21.

Figure 9:
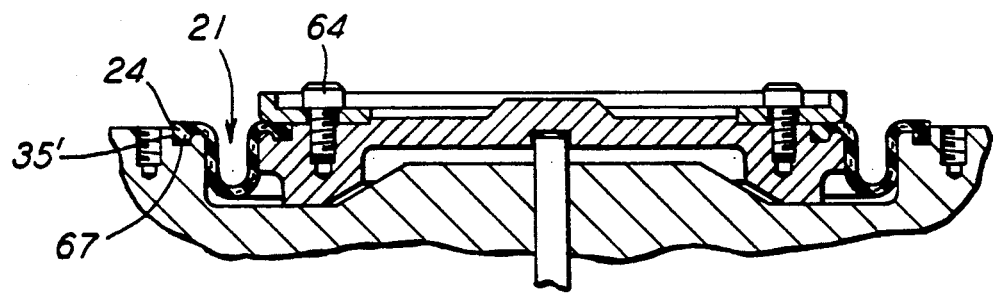
Figure 10:
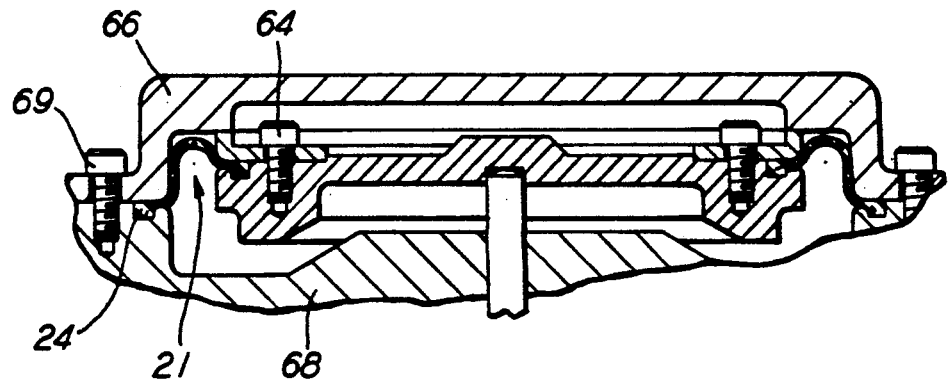

In FIG. 9, outer clamping bead 24 is shown inserted in an annular clamping groove 67 formed in a body 68 in which piston member 60 operates, it being appreciated that the radial dimension of the outside surface 35' is now able to be more closely held to tolerance than heretofore, due to the absence of any fabric and trimmed flashing at this surface. Accordingly, the outer clamping bead 24 will acquire a better fit within groove 67 to prevent the outer periphery of the diaphragm from flipping out of its clamping groove, due to its oval-shaped predisposition, as previously discussed.

Moreover, the improved fit of outer clamping bead 24 in clamping groove 67, in accordance with the present invention, will better maintain the outer diaphragm periphery in place, as the diaphragm is subsequently deformed to a convoluted configuration to permit cover 66 to be secured to body 68 by screws 69, to thereby clamp outer bead 24 in place relative to body 68, as shown in FIG. 10.

In addition to diaphragm 21 of the present invention facilitating diaphragm assembly, as above discussed, such assembly is uni-directional. This uni-directional assembly requires that the diaphragm be turned upside-down and mounted to piston member 60 in its "as molded" configuration, after which the diaphragm is turned inside-out to an inverted configuration in which surface 35' is transposed to the outer diaphragm periphery. If the foregoing procedure is not adhered to, the smooth, fabric free surface 35' will not be transposed, as desired. By requiring such uni-directional assembly, the spring effect of the diaphragm convolution is assured of being consistently in a favorable direction.

It will be further appreciated that diaphragm 21, in its "as molded" configuration, may have its flashing, which is formed in the molding process, removed by a trim die in a manner similar to a diaphragm of the prior art type, since in the "as molded" configuration, the flashing is at the diaphragm outer periphery.

We claim:

1. A method of making an annular, conical-type diaphragm having a truncated skirt portion interposed between inner and outer clamping beads comprising the steps of:
   (a) providing an annular, preformed blank of elastomeric material;
   (b) providing a curing mold consisting of a male portion and a female portion between which is formed a diaphragm cavity, that portion of said diaphragm cavity corresponding to said outer clamping bead of said diaphragm including a sidewall and a bottom surface, the parting line between said male and female portions intersecting said sidewall at a location displaced from the juncture of said sidewall and bottom surfaces, whereby said bottom surface and at least part of said sidewall are formed (being formed at least in part) in the same one of said male and female portions of said curing mold;
   (c) inserting said preformed blank in said curing mold within said diaphragm cavity;
   (d) curing said preformed blank in the shape of said diaphragm;
   (e) removing the cured diaphragm from said curing mold; and
   (f) trimming the cured diaphragm at said outer clamping bead to remove therefrom flashing formed along said parting line.

2. The method as recited in claim 1, wherein said bottom surface and at least part of said sidewall are formed in said male portion of said curing mold.

3. The method as recited in claim 1, further comprising an overflow cavity communicated with said diaphragm cavity and being formed along said parting line.

4. The method as recited in claim 3, wherein said preformed blank includes a sheet of fabric material interposed between opposing outer layers of elastomeric material, said preformed blank being inserted in said curing mold such that said sheet of fabric material lies within said overflow cavity, said fabric material being trimmed with said flashing.

5. A molded annular elastomeric diaphragm member having a truncated conical form in a free unstressed state in which it is molded, a tapered side of said conical diaphragm member including a skirt portion terminating in an inner clamping bead comprising an inner periphery of said diaphragm member and an outer clamping bead comprising an outer periphery of said diaphragm member and a layer of reinforcing fabric imbedded within an elastomeric compound from which said diaphragm member is molded, said outer clamping bead having a sidewall defining said outer periphery of said diaphragm member and a bottom surface defining a base of said diaphragm member in said free unstressed state thereof, said sidewall and said bottom surface of said clamping bead intersecting at a juncture therebetween, said reinforcing fabric emerging from said diaphragm member along said sidewall at a location displaced from said juncture of said sidewall and said bottom surface, said bottom surface of said outer clamping bead being absent of said fabric, so that when said diaphragm member is inverted, said bottom surface is transposed to said outer periphery of said diaphragm member whereby said outer periphery thereof is absent of said fabric.

* * * * *